(12) United States Patent
Furui

(10) Patent No.: US 9,843,781 B1
(45) Date of Patent: Dec. 12, 2017

(54) PROJECTOR

(71) Applicant: SEIKO EPSON CORPORATION, Tokyo (JP)

(72) Inventor: Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/488,847

(22) Filed: Apr. 17, 2017

(30) Foreign Application Priority Data

May 18, 2016 (JP) ................................ 2016-099216

(51) Int. Cl.
| | | |
|---|---|---|
| *H04N 9/31* | (2006.01) | |
| *H04N 5/247* | (2006.01) | |
| *G06T 7/70* | (2017.01) | |
| *G02B 7/14* | (2006.01) | |

(52) U.S. Cl.
CPC ............. *H04N 9/3182* (2013.01); *G02B 7/14* (2013.01); *G06T 7/70* (2017.01); *H04N 5/247* (2013.01); *H04N 9/315* (2013.01); *H04N 9/3185* (2013.01); *H04N 9/3194* (2013.01)

(58) Field of Classification Search
CPC ........ H04N 9/3194; H04N 9/315; H04N 9/28; H04N 9/3185; H04N 9/3129; H04N 9/31; H04N 9/3182; H04N 5/74; H04N 5/247; H04N 9/3197; H04N 9/3141; G06T 7/70; G02B 7/14
USPC ......... 348/744, 745, 747, 806, 333.1, 222.1, 348/240.99, 333.01, 369; 353/71, 30
See application file for complete search history.

(56) References Cited

U.S. PATENT DOCUMENTS

| | | | |
|---|---|---|---|
| 9,299,321 B2 | 3/2016 | Ohno | |
| 2010/0134643 A1* | 6/2010 | Koishi | ................... G03B 29/00 348/222.1 |
| 2014/0293243 A1 | 10/2014 | Furui | |
| 2015/0350615 A1* | 12/2015 | Ono | ...................... G06F 3/0418 348/140 |

FOREIGN PATENT DOCUMENTS

| | | |
|---|---|---|
| JP | 2014-197739 A | 10/2014 |
| JP | 2015-167341 A | 9/2015 |

* cited by examiner

*Primary Examiner* — Sherrie Hsia
(74) *Attorney, Agent, or Firm* — Oliff PLC

(57) ABSTRACT

A projector includes a projection lens, a distance information acquiring section that acquires distance information relating to the distance from the projector to a projection surface, a first imaging section that captures an image of the projection surface, a second imaging section that has an angle of view wider than the angle of view of the first imaging section and captures an image of the projection surface, and a control unit. The second imaging section is disposed in a position closer to the optical axis of the projection lens than the first imaging section. The control section causes the first imaging section to capture an image in a case where the distance from the projector to the projection surface is greater than or equal to a predetermined threshold and the second imaging section to capture an image in a case where the distance is smaller than the threshold.

4 Claims, 7 Drawing Sheets

PROJECTOR

The entire disclosure of Japanese Patent Application No. 2016-099216, filed May 18, 2016 is expressly incorporated by reference herein.

BACKGROUND

1. Technical Field

The present invention relates to a projector.

2. Related Art

There is a known system in which a camera built in a projector captures an image of the projection state of the projector and the projection color and the projection position, and other factors are measured and automatically corrected in an appropriate manner (JP-A-2015-167341, JP-A-2014-197739).

In general, the projection distance of a projector is set in a variety of ways in some cases in accordance with the situation in which the projector is used. A camera built in the projector is required to be capable of capturing an image of a projection image projected on a screen (projection surface) irrespective of the projection distance of the projector. However, since a parallax affect an image captured with the built-in camera and an image projected through a projection lens, the position of the projection image in the image captured with the built-in camera undesirably greatly changes depending on the projection distance. For example, in a case where the projection distance is large, the parallax between the built-in camera and the projection lens is relatively small, and the position of the projection image in the captured image does not greatly change even when the projection distance changes to some extent. On the other hand, when the projection distance is small, the position of the projection image in the captured image greatly changes even when the projection distance varies by a small amount, and it is likely to be difficult to reliably detect the projection image from the captured image.

SUMMARY

An advantage of some aspects of the invention is to solve at least a part of the problems described above, and the invention can be implemented as the following forms or application examples.

(1) According to an aspect of the invention, a projector that projects an image on a projection surface is provided. The projector includes a projection lens, a distance information acquiring section that acquires distance information relating to a distance from the projector to the projection surface, a first imaging section that captures an image of the projection surface, a second imaging section that has an angle of view wider than an angle of view of the first imaging section and captures an image of the projection surface, and a control section. The first imaging section is disposed at a first distance from an optical axis of the projection lens in a direction perpendicular to the optical axis, and the second imaging section is disposed at a second distance smaller than the first distance from the optical axis of the projection lens in the direction perpendicular to the optical axis. The control section causes the first imaging section to capture an image of the projection surface in a case where the distance information shows that the distance from the projector to the projection surface is greater than or equal to a predetermined threshold and the second imaging section to capture an image of the projection surface in a case where the distance information shows that the distance from the projector to the projection surface is smaller than the threshold.

According to the projector, since the second imaging section, which has a wider angle of view and captures an image of the projection surface, is disposed in a position closer to the optical axis of the projection lens than the first imaging section, the parallax between the second imaging section and the projection lens is relatively small. As a result, the change in the position of a projection image in a captured image according to a change in the projection distance can be reduced.

(2) The projector described above may further include a lens attachment section to which a first projection lens for long-distance projection or a second projection lens for short-distance projection is attached in an exchangeable manner. The distance information acquiring section may acquire, as the distance information, information that identifies a projection lens attached to the lens attachment section. The control section may cause the first imaging section to capture an image of the projection surface in a case where the distance information shows that the first projection lens is attached to the lens attachment section and the second imaging section to capture an image of the projection surface in a case where the distance information shows that the second projection lens is attached to the lens attachment section.

According to the configuration described above, an appropriate one of the imaging sections is allowed to perform imaging in accordance with the attached projection lens.

(3) In the projector described above, the distance information acquiring section may acquire information representing a projection distance of the projection lens as the distance information, and the control section may cause the first imaging section to capture an image of the projection surface in a case where the distance information shows that the projection distance is greater than or equal to the threshold and the second imaging section to capture an image of the projection surface in a case where the distance information shows that the projection distance is smaller than the threshold.

According to the configuration described above, an appropriate one of the imaging sections is allowed to perform imaging in accordance with the projection distance.

(4) The projector described above may further include an adjustment section that adjusts a projection image projected on the projection surface based on a captured image captured by the first imaging section or the second imaging section.

According to the configuration described above, a projection image projected on the projection surface can be appropriately adjusted on the basis of a captured image captured by the first imaging section or the second imaging section.

The invention can be implemented in a variety of forms, for example, in the form of a projector, a method for controlling the projector, a computer program for achieving the functions of the projector and the method for controlling the projector, and a non-transitory storage medium on which the computer program is stored.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. Arrangement of Projection Lens and Built-in Camera of Projector

Figure 1:
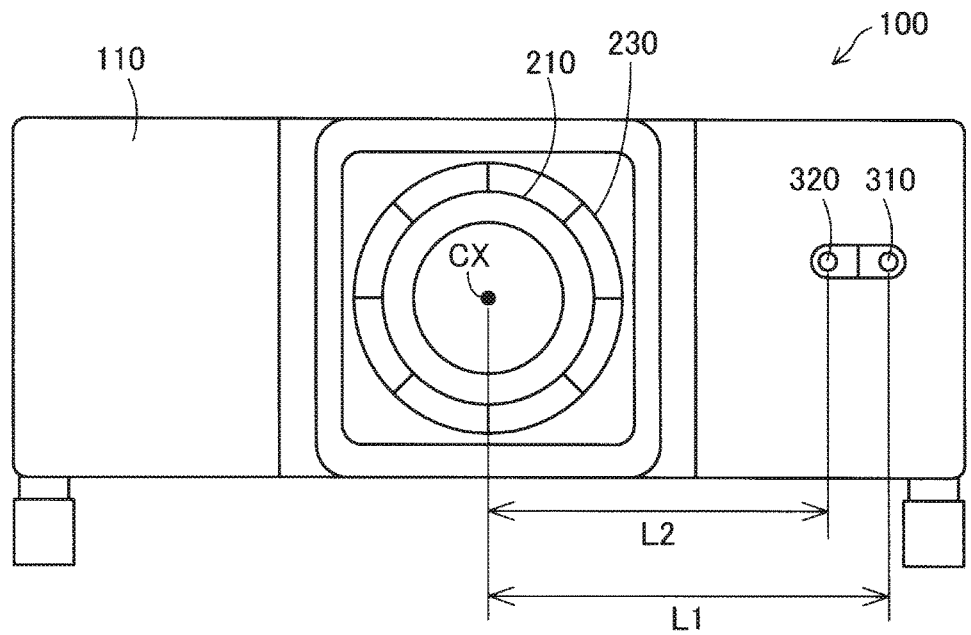
FIG. 1 is a front view showing the state in which a projection lens for long-distance projection is attached to a projector.
Figure 2:
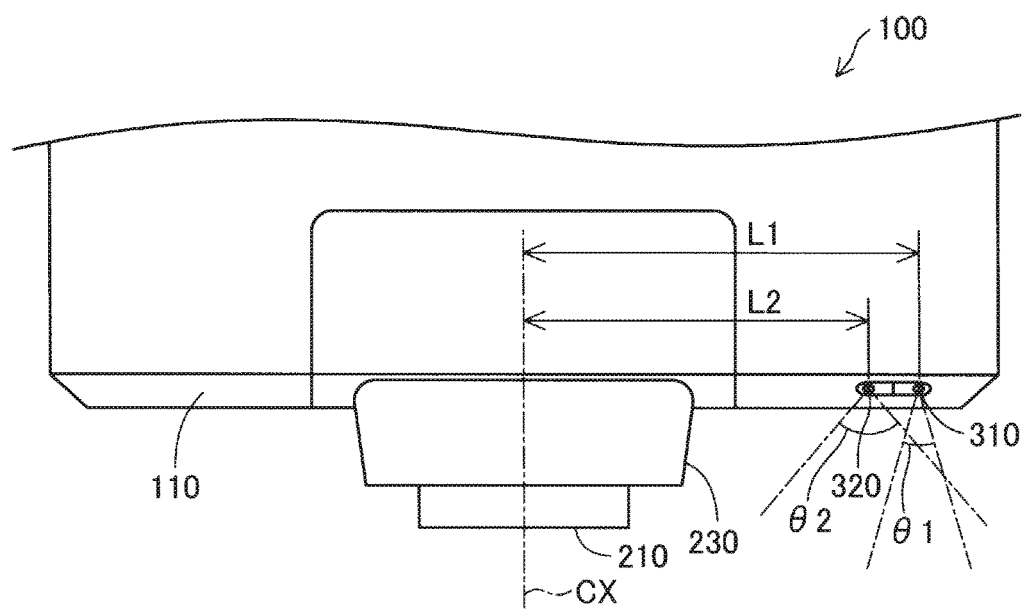
FIG. 2 is a perspective view of the projector with the projection lens in FIG. 1 viewed from above.

FIG. 1 is a front view showing the state in which a first projection lens 210 for long-distance projection is attached to a projector 100, and FIG. 2 is a perspective view of the projector 100 with the first projection lens 210 viewed from above. The first projection lens 210 and two built-in cameras 310 and 320, each of which captures an image projected on the projection surface, are provided on a front panel 110 of the projector 100. The first projection lens 210 is attached to a lens attachment section 230 in an exchangeable manner.

The first camera 310 is a first imaging section for long-distance imaging, and the second camera 320 is a second imaging section for short-distance imaging. The cameras 310 and 320 preferably differ from each other in terms of at least one of the following items (1) to (3), and the item (1) is the most typical difference.

(1) The angle of view $\theta 2$ (FIG. 2) of the second camera 320 for short-distance imaging is greater than the angle of view $\theta 1$ of the first camera 310 for long-distance imaging.

(2) The focal length of the second camera 320 for short-distance imaging is shorter than the focal length of the first camera 310 for long-distance imaging.

(3) The resolution of the second camera 320 for short-distance imaging is lower than the resolution of the first camera 310 for long-distance imaging (The number of pixels of the former is smaller than that of the latter).

The first camera 310 for long-distance imaging is disposed in a position separate from the optical axis CX of the first projection lens 210 by a first distance L1 in a direction perpendicular to the optical axis CX. The second camera 320 for short-distance imaging is disposed in a position separate from the optical axis CX of the first projection lens 210 by a second distance L2, which is shorter than the first distance L1, in the direction perpendicular to the optical axis CX. The reason for this will be described later.

Figure 3:
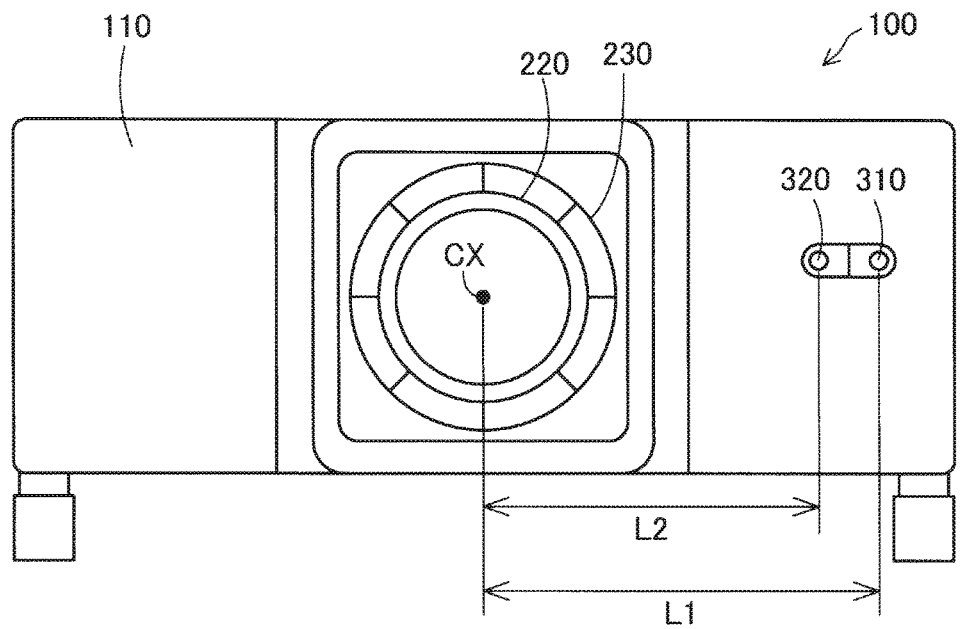
FIG. 3 is a front view showing the state in which a projection lens for short-distance projection is attached to the projector.
Figure 4:
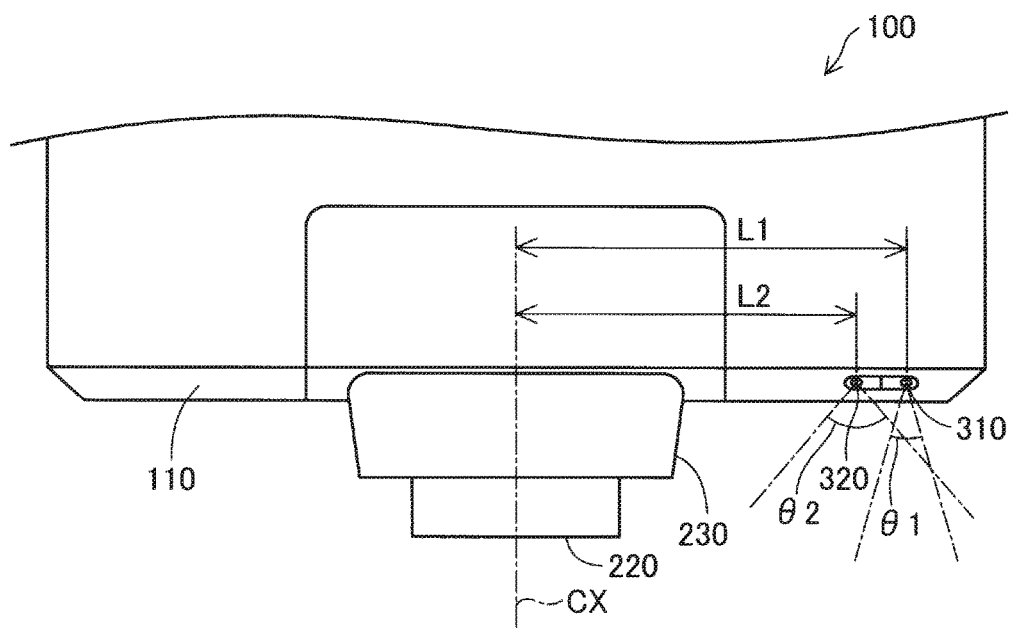
FIG. 4 is a perspective view of the projector with the projection lens in FIG. 3 viewed from above.

FIG. 3 is a front view showing the state in which a second projection lens 220 for short-distance projection is attached to the projector 100, and FIG. 4 is a perspective view of the projector 100 with the second projection lens 220 viewed from above. The distances L1 and L2 between the optical axis CX of the projection lens 220 and the cameras 310, 320 are the same as those in FIGS. 1 and 2.

Figure 5:
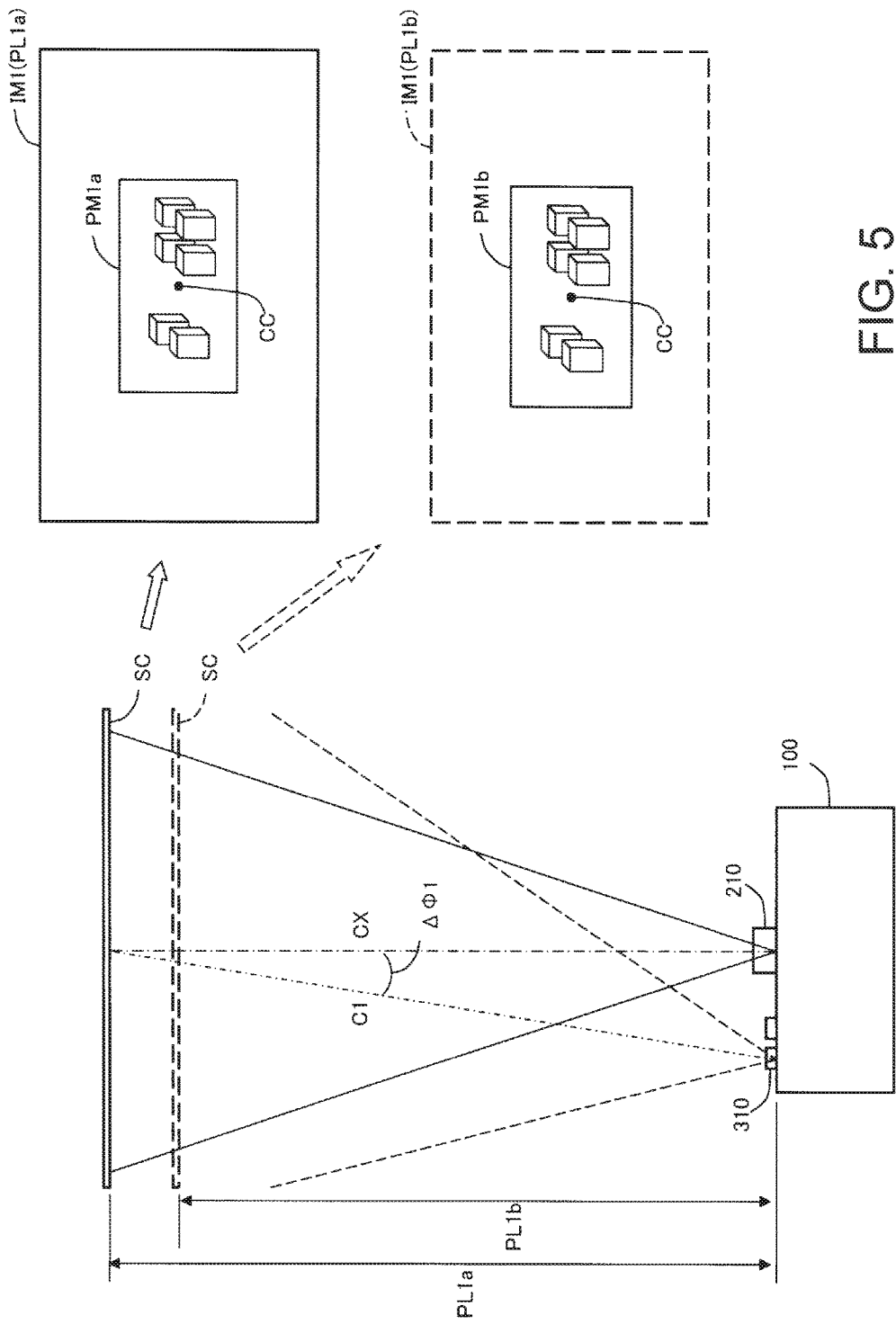
FIG. 5 is a descriptive diagram showing influence of a parallax between the projection lens for long-distance projection and a first camera.

FIG. 5 is a descriptive diagram showing influence of a parallax $\Delta\phi 1$ between the projection lens 210 for long-distance projection and the first camera 310. The optical axis C1 of the first camera 310 preferably so inclines as to approach the optical axis CX of the projection lens 210. In particular, it is preferable that the optical axis C1 of the first camera 310 is so set as to roughly intersect the optical axis CX of the projection lens 210 on a projection surface SC, which is separate from the projector 100 by a projection distance PL1a, which is a standard projection distance at the time of long-distance projection. The projection lens 210 projects an image on the projection surface SC (screen surface). The first camera 310 captures an image of the projection surface SC to acquire a captured image IM1. FIG. 5 shows captured images IM1 (PL1a) and IM1 (PL1b), which are examples of images of the projection surface SC located at two different projection distances PL1a and PL1b. The captured images IM1 (PL1a) and IM1 (PL1b) contain projection images PM1a and PM1b, respectively. The projection images PM1a and PM1b are the same image but have different sizes and are located in different positions in the captured images IM1 in accordance with the difference between the projection distances PL1a and PL1b. In FIG. 5, the position of the center CC of each of the projection images PM1a and PM1b is shown for ease of illustration. In the long-distance projection, in which the projection distances PL1a and PL1b are relatively large, the parallax $\Delta\phi 1$ between the projection lens 210 and the first camera 310 is relatively small. Therefore, even when the projection distance changes to some extent, the position of the center CC of each of the projection images PM1a and PM1b in the captured images IM1 (PL1a) and IM1 (PL1b) does not greatly change.

Figure 6:
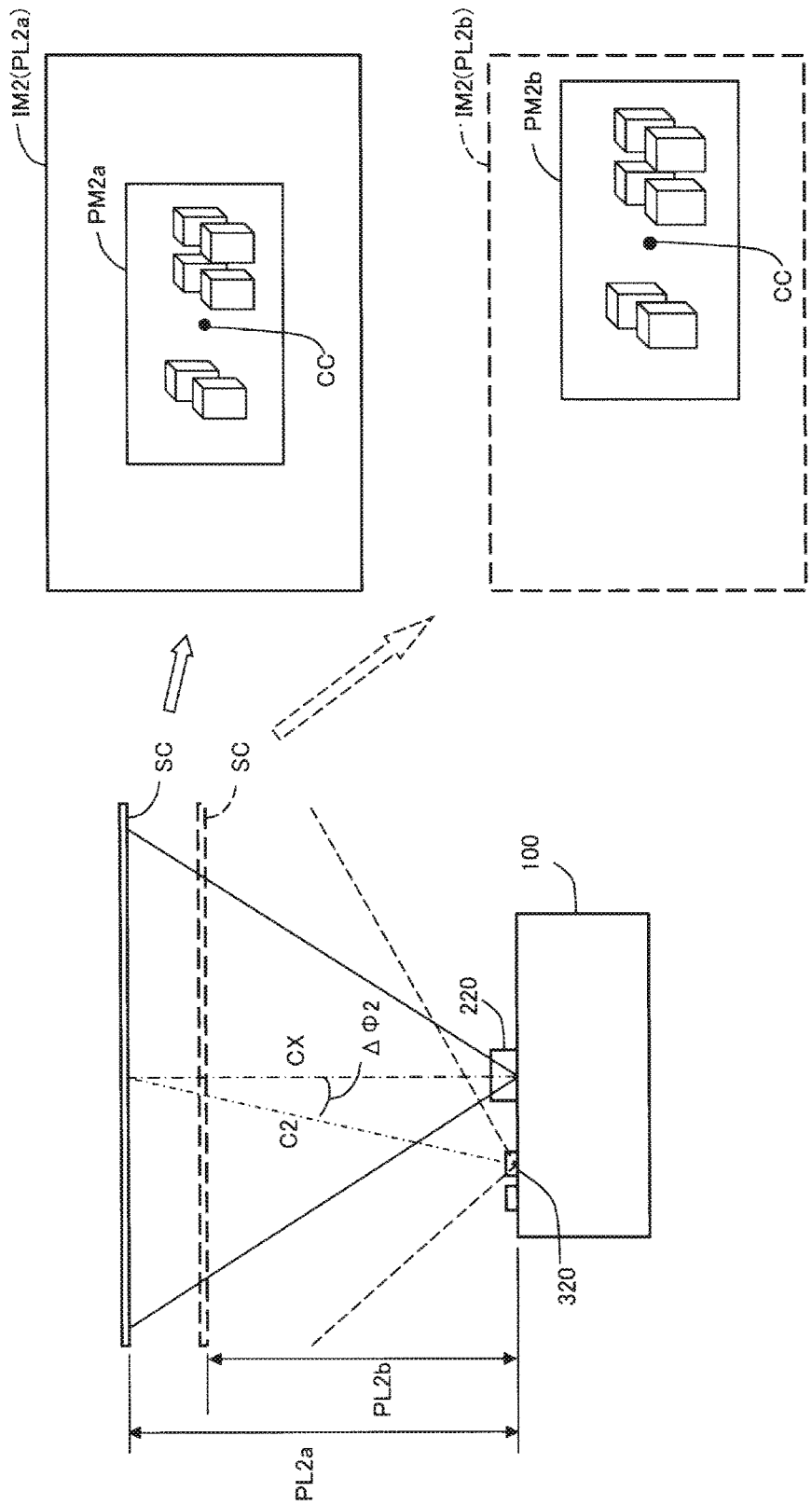
FIG. 6 is a descriptive diagram showing influence of parallax between the projection lens for short-distance projection and a second camera.

FIG. 6 is a descriptive diagram showing influence of a parallax $\Delta\phi 2$ between the projection lens 220 for short-distance projection and the second camera 320. The optical axis C2 of the second camera 320 preferably so inclines as to approach the optical axis CX of the projection lens 220. In particular, it is preferable that the optical axis C2 of the second camera 320 is so set as to roughly intersect the optical axis CX of the projection lens 220 on the projection surface SC, which is separate from the projector 100 by a projection distance PL2a, which is a standard projection distance at the time of short-distance projection. FIG. 6 shows captured images IM2 (PL2a) and IM2 (PL2b), which are examples of images of the projection surface SC located at two different projection distances PL2a and PL2b, as in FIG. 5. The captured images IM2 (PL2a) and IM2 (PL2b) contain projection images PM2a and PM2b, respectively. The parallax $\Delta\phi 2$ between the projection lens 220 and the second camera 320 in the short-distance projection is greater than that in the long-distance projection. Therefore, when the projection distance changes, the position of the center CC of each of the projection images PM2a and PM2b in the captured images IM2 (PL2a) and IM2 (PL2b) is likely to greatly change as compared with the case of long-distance projection.

In the present embodiment, however, in which the second camera 320 for short-distance imaging is disposed in a position closer to the projection lens 210 or 220 than the first camera 310, the change in the positions of the projection images PM2a and PM2b is suppressed to a small value. That is, the arrangement in which the second camera 320 is disposed in a position closer to the projection lens 210 or 220 than the first camera 310 allows the parallax $\Delta\phi 2$ between the second camera 320 and the projection lens 220 to be relatively small. Therefore, in the case where the projection lens 220 for the short-distance projection is used to perform projection, the change in the positions of the projection images PM2a and PM2b in the captured images IM2 (PL2a) and IM2 (PL2b) captured with the second camera 320 can be reduced even when the projection distance changes to some extent.

The positional relationship between the cameras 310 and 320 may be so set that the cameras are arranged side by side in the lateral direction (horizontal direction), as in the example shown in FIGS. 1 to 4, or may instead be so set that the cameras are arranged in arbitrary positions, such as positions on a circle concentric with the optical axis CX of the projection lenses 210 and 220. In a case where the projector is provided with three or more cameras, the cameras may be sequentially so arranged that a camera having a wider angle of view is disposed in a position closer to the optical axis CX of the projection lenses 210 and 220.

Figure 7:
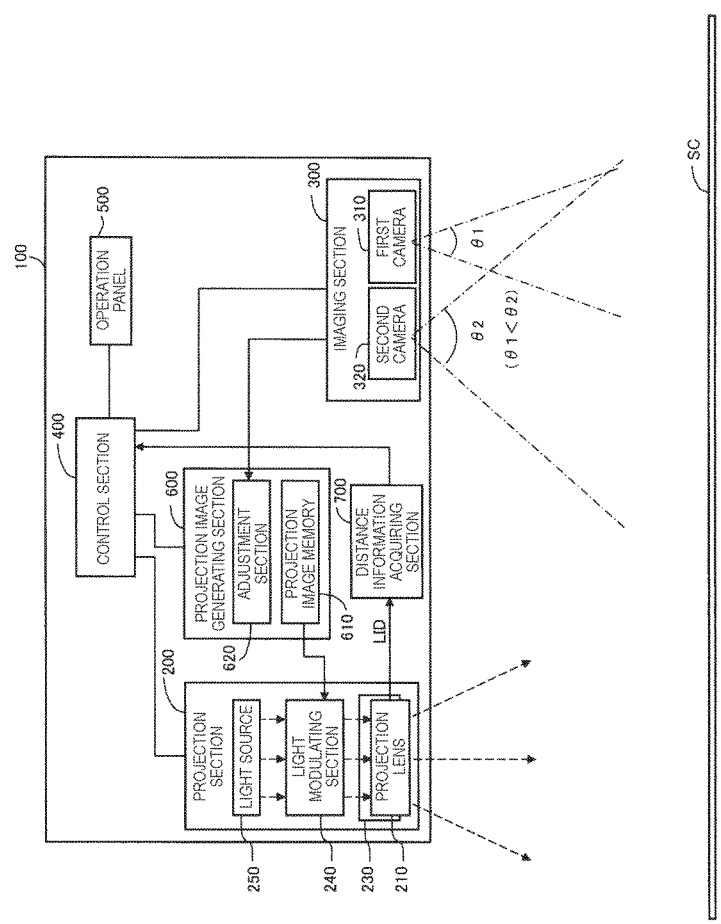
FIG. 7 is a functional block diagram of the projector in the first embodiment.

B. Functional Blocks of Projector According to First Embodiment and Example of Image Adjustment FIG. 7 is a functional block diagram of the projector in the first embodiment. The projector 100 includes a control section 400, an operation panel 500, a projection section 200, a projection image generating section 600, a distance information acquiring section 700, and an imaging section 300. The imaging section 300 includes the first camera 310 for long-distance imaging and the second camera 320 for short-distance imaging described above.

The control section 400 controls the sections described above in the projector 100. The control section 400 has the function of causing the first camera 310 or the second camera 320 to capture an image of the projection surface SC (screen surface) in accordance with distance information acquired by the distance information acquiring section 700.

The projection image generating section 600 has the function of generating a projection image to be projected by the projection section 200 on the projection surface SC and includes a projection image memory 610, which stores the projection image, and an adjustment section 620, which adjusts the projection image.

The adjustment section 620 carries out the process of adjusting a projection image to be projected on the projection surface SC on the basis of a captured image captured with the first camera 310 or the second camera 320. The adjustment process preferably includes, for example, keystone correction in which trapezoidal distortion of a projection image is corrected and correction of the color of a projection image. To perform correction of the color of a projection image, a measurement pattern for measuring the color of projection light is projected from the projection section 200, and the first camera 310 or the second camera 320 measures the projection color for correction of the color of the projection light. Specifically, the adjustment section 620 calculates gain values for adjustment of the balance among red, green, and blue at each of a plurality of grayscale levels, the amount of lightness correction for correction of gamma characteristics, correction data on a point basis for correction of in-plane color unevenness, and other factors. The adjustment section 620 then uses the calculated correction values to perform correction that allows the light projected by the projector 100 to have a desired color tone.

The projection section 200 has the function of projecting a projection image generated by the projection image generating section 600 on the projection surface SC. The projection section 200 includes the projection lens 210 and the lens attachment section 230 described with reference to FIG. 1 and further includes a light modulating section 240 and a light source 250. The light modulating section 240 modulates light from the light source 250 in accordance with projection image data supplied from the projection image memory 610 to form projection image light. The projection image light is typically color image light containing RGB three-color visible light and projected by the projection lens 210 on the projection surface SC. The light source 250 can be a light source lamp, such as an ultrahigh-pressure mercury lamp, or any of a variety of other light sources, such as a light emitting diode and a laser diode. The light modulating section 240 can be a transmissive or reflective liquid crystal panel, a digital mirror device, or any other component or may have a configuration including a plurality of light modulating sections 240 on a color basis.

The distance information acquiring section 700 acquires distance information on the projection distance of the projector 100. In the example shown in FIG. 7, the portion where the projection lens 210 (or 220) is connected to the lens attachment section 230 is provided with a physically or electrically determinable bit, and a lens identifying signal LID representing the value of the determinable bit is supplied as the distance information from the lens attachment section 230 to the distance information acquiring section 700. The distance information acquiring section 700 supplies the control section 400 with the distance information LID. The distance information LID has a meaning as information representing whether the projection distance of the projector 100 is large or small. That is, the control section 400 can evaluate whether or not the distance from the projector 100 to the projection surface SC (projection distance) is greater than or equal to a predetermined threshold in accordance with the distance information LID. Specifically, the control section 400 can determine that the distance to the projection surface SC (projection distance) is greater than or equal to the predetermined threshold in a case where the distance information (lens identification signal LID) represents that the first projection lens 210 is attached to the lens attachment section 230. On the other hand, the control section 400 can determine that the distance to the projection surface SC (projection distance) is smaller than the predetermined threshold in a case where the distance information (lens identification signal LID) represents that the second projection lens 220 is attached to the lens attachment section 230.

In the case where the distance information LID represents that the distance from the projector 100 to the projection surface SC is greater than or equal to the predetermined threshold, the control section 400 causes the first camera 310 to capture an image of the projection surface SC. On the other hand, in the case where the distance information LID represents that the distance from the projector 100 to the projection surface SC is smaller than the predetermined threshold, the control section 400 causes the second camera 320 to capture an image of the projection surface SC. An appropriate one of the cameras 310 and 320 can thus be selected in according with the currently attached projection lens, and the selected camera is allowed to perform imaging.

The distance information acquiring section 700 may acquire the distance information on the projection distance of the projector 100 in accordance with an instruction from a user who uses the operation panel 500 or a remote control (not shown) instead of receiving the lens identification signal LID as the distance information from the lens attachment section 230.

Figure 8:
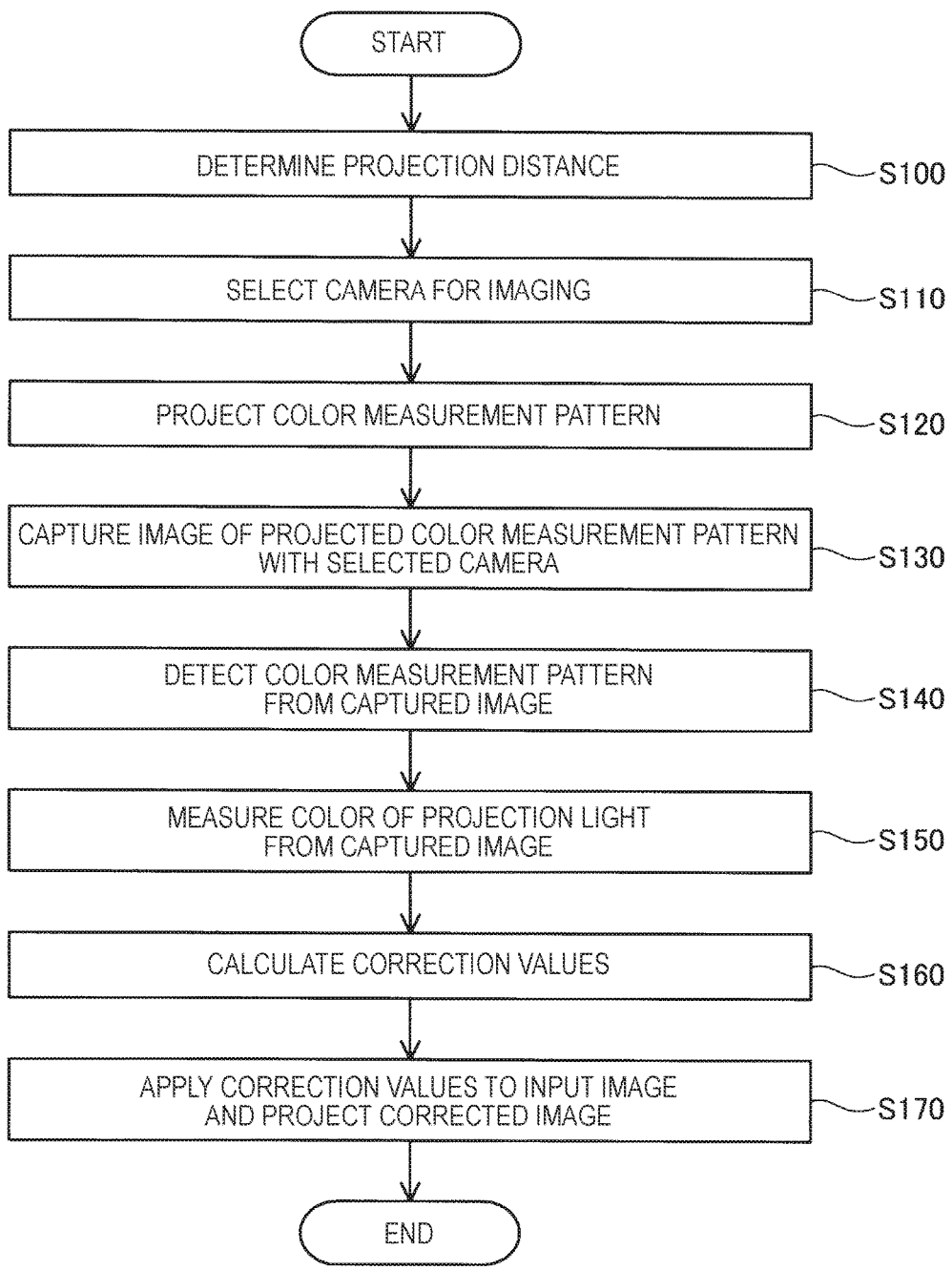
FIG. 8 is a flowchart showing an example of an image adjustment process.

FIG. 8 is a flowchart showing an example of the image adjustment process. The image adjustment process is initiated, for example, when the user uses an operation key on the operation panel 500 (FIG. 7), the remote control (not shown), or any other component to instruct the projector 100 to initiate the image adjustment process. The following description will be made of a case where a color correction process is carried out as an example of the image adjustment process.

In step S100, the control section 400 determines the projection distance. Specifically, in the case where the first projection lens 210 for the long-distance projection is attached to the lens attachment section 230, the control section determines that the projection distance is the "long distance", whereas in the case where the second projection lens 220 for the short-distance projection is attached to the lens attachment section 230, the control section determines that the projection distance is the "short distance".

In step S110, the control section 400 selects one of the plurality of cameras 310 and 320 in the imaging section 300 in accordance with a result of the determination of the projection distance. Specifically, the control section 400, when it determines that the projection distance is the "long distance", selects the first camera 310 for long-distance imaging, whereas the control section 400, when it determines that the projection distance is the "short distance", selects the second camera 320 for short-distance imaging. The control section 400 may further perform initial setting for imaging operation and other types of processing on the selected camera as necessary.

In step S120, the control section 400 causes the projection image generating section 600 to carry out the process of drawing the color measurement pattern in the projection image memory 610 and causes the projection section 200 to projects the color measurement pattern. It is preferable that the color measurement pattern contains, for example, a plurality of red, green, and blue single-color standard images, and that each of the color standard images is divided into a plurality of small areas having a plurality of grayscales from 0 (lowest grayscale) to 255 (highest grayscale). An image containing a white portion and a half-tone gray portion may instead be used as the color measurement pattern. To allow easy recognition of the position of the color measurement pattern from a captured image, a position detection pattern, such as an entirely white image or a cross-hatched image, may be projected before the color measurement pattern is projected.

In step S130, the control section 400 causes the camera selected in step S110 to capture an image of the projected color measurement pattern. The processes in step S140 and the following steps are carried out by the adjustment section 620 (FIG. 7).

In step S140, the adjustment section 620 detects the color measurement pattern from the captured image. In the case of the long-distance projection, the position of the color measurement pattern in the captured image does not greatly change even when the projection distance changes to some extent, as described with reference to FIG. 5, whereby the color measurement pattern can be readily detected from the captured image. On the other hand, in the case of the short-distance projection, the position of the color measurement pattern in the captured image greatly changes in correspondence with a change in the projection distance, as compared with the case of the long-distance projection, as described in FIG. 6. In the present embodiment, however, since the second camera 320 for short-distance imaging is disposed closer to the projection lens 220 than the first camera 310 for long-distance imaging, the change in the position of the color measurement pattern is minimized, whereby the position of the color measurement pattern in the captured image can be estimated. The adjustment section 620 can therefore readily detect the color measurement pattern from the captured image.

In step S150, the adjustment section 620 extracts the color component of the projection light from the color measurement pattern in the captured image and measures the color of the light currently projected by the projector 100.

In step S160, the adjustment section 620 calculates correction values that change the color of the light projected by the projector 100 to a desired color on the basis of the color measured by using the color measurement pattern. Specifically, the adjustment section 620 calculates gain values for adjustment of the balance among red, green, and blue at each grayscale, the amount of lightness correction for gamma correction, correction data on a point basis for correction of in-plane color unevenness, and other factors.

In step S170, the adjustment section 620 applies the correction values obtained in step S160 to an input image to perform color correction and causes the projection section 200 to project a projection image after the color correction. The color correction can be performed, for example, by setting the correction values in a color correction circuit (not shown). As a result, the projection light from the projector 100 is corrected to projection light having a predetermined color tone.

As described above, in the first embodiment, when the distance information LID shows that the distance from the projector 100 to the projection surface SC is greater than or equal to the predetermined threshold, the first camera 310 (first imaging section) is used to capture an image of the projection surface SC, whereas when the distance information LID shows that the distance from the projector 100 to the projection surface SC is smaller than the predetermined threshold, the second camera 320 (second imaging section), which is disposed in a position closer to the optical axis CX of the projection lens than the first camera 310, is used to capture an image of the projection surface SC. As a result, the parallax between the second camera 320 and the projection lens 220 is relatively small, and the change in the position of a projection image in a captured image according to a change in the projection distance can be reduced. The projection image can therefore be readily recognized from the captured image.

C. Functional Blocks of Projector in Second Embodiment

Figure 9:
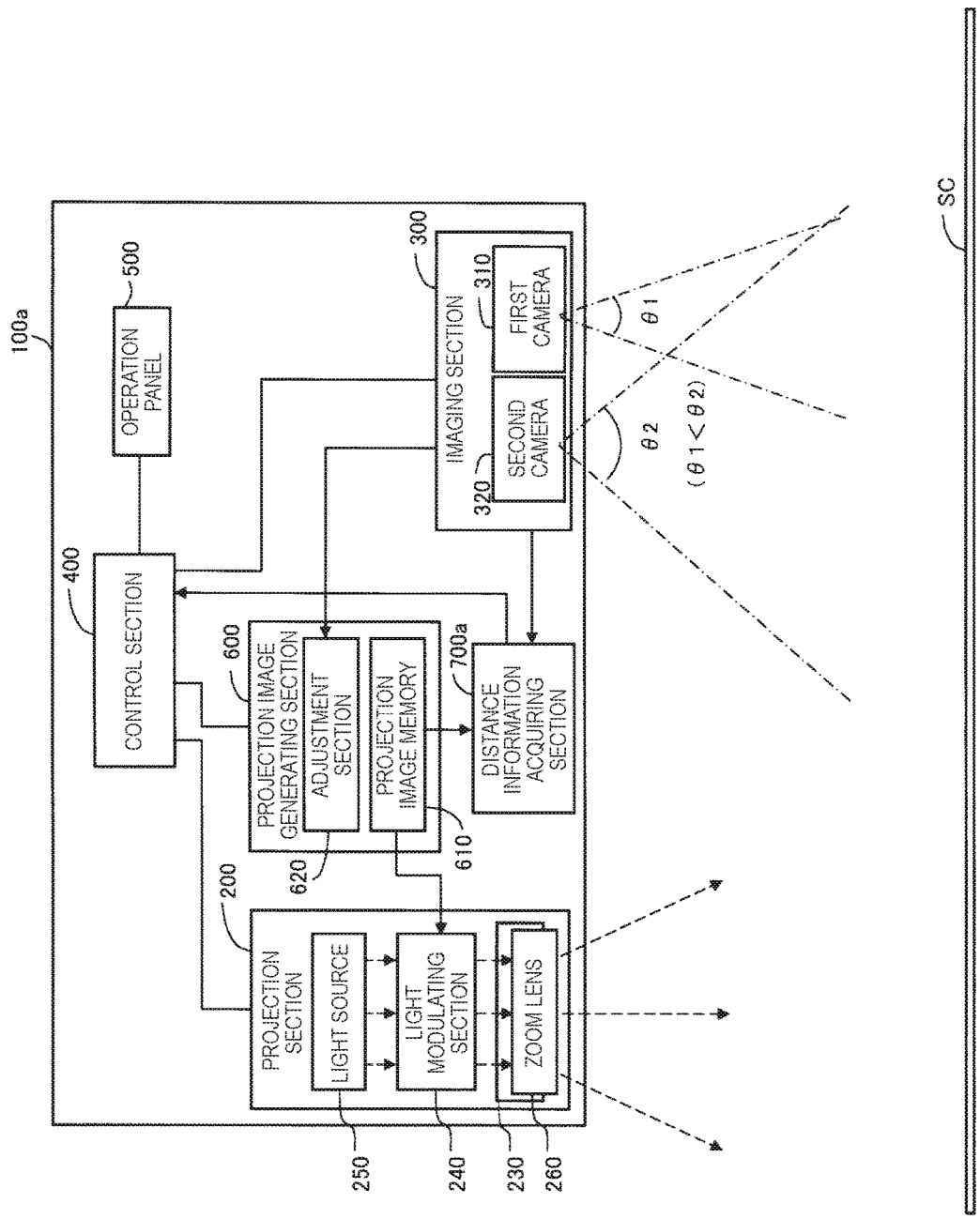
FIG. 9 is a functional block diagram of a projector in a second embodiment.

FIG. 9 is a functional block diagram of a projector in a second embodiment. The second embodiment differs from the first embodiment shown in FIG. 7 in the following two points: The exchangeable projection lens 210 is replaced with a zoom lens 260, which changes the projection distance; and a distance information acquiring section 700a acquires the distance information representing the projection distance of the zoom lens 260, and the other configurations in the second embodiment are the same as those in the first embodiment.

The zoom lens 260, which changes the projection distance to the projection surface SC, has a zoom lens function that allows projection of an image over a wide projection distance range that covers the long-distance projection to the short-distance projection.

The distance information acquiring section 700a acquires the distance information representing the projection distance of the zoom lens 260. Specifically, for example, the distance information acquiring section 700a uses triangulation using a projection image stored in the projection image memory 610 and a captured image that is an image of the projection image projected on the projection surface SC and captured with the first camera 310 or the second camera 320 to acquire the distance information representing the projection distance of the zoom lens 260. In this distance measurement, a projection image containing a reference mark for distance measurement is used. In the case where the distance information shows that the projection distance is greater than or equal to the predetermined threshold, the control section 400 causes the first camera 310 to capture an image of the projection surface SC, for example, in the following image adjustment process. On the other hand, in the case where the distance information shows that the projection distance is smaller than the predetermined threshold, the control section 400 causes the second camera 320 to capture an image of the projection surface SC, for example, in the following image adjustment process. As a result, a more appropriate one of the cameras 310 and 320 can be selected in accordance with an actual projection distance, and the selected camera is allowed to perform imaging.

The distance information acquiring section 700a may instead acquire the distance information by using a method other than the distance measurement using triangulation described above. For example, a sensor capable of acquiring the focal point of the zoom lens 260 may be attached to the zoom lens 260, and the distance from the focal point to the projection surface SC may be calculated. Instead, a distance sensor (not shown) may be so provided as to directly measure the projection distance. Still instead, the distance information acquiring section 700a may acquire the projection distance of a projection lens having no zoom function as the distance information in place of the projection distance of a projection lens having a zoom function.

The invention is not limited to the examples and embodiments described above and can be implemented in a variety of other aspects to the extent that they do not depart from the substance of the invention.

Variation 1:

The adjustment of a projection image can be a variety of types of adjustment other than the correction of the color of the light from the projector 100 described above. For example, trapezoidal distortion correction, correction of distortion produced when an image is projected on a curved projection surface SC, and other types of correction may be performed. Further, to perform multi-projection using a plurality of projectors, correction of differences in the color tone of projection light among the individual projectors, correction for achieving uniform brightness, correction of shifts of the projection positions relative to one another, and other types of correction may be performed.

What is claimed is:

1. A projector that projects an image on a projection surface, the projector comprising:
   a projection lens;
   a distance information acquiring section that acquires distance information relating to a distance from the projector to the projection surface;
   a first imaging section that captures an image of the projection surface;
   a second imaging section that has an angle of view wider than an angle of view of the first imaging section and captures an image of the projection surface; and
   a control section,
   wherein the first imaging section is disposed at a first distance from an optical axis of the projection lens in a direction perpendicular to the optical axis,
   the second imaging section is disposed at a second distance smaller than the first distance from the optical axis of the projection lens in the direction perpendicular to the optical axis, and
   the control section causes
      the first imaging section to capture an image of the projection surface in a case where the distance information shows that the distance from the projector to the projection surface is greater than or equal to a predetermined threshold, and
      the second imaging section to capture an image of the projection surface in a case where the distance information shows that the distance from the projector to the projection surface is smaller than the threshold.

2. The projector according to claim 1,
   further comprising a lens attachment section to which a first projection lens for long-distance projection or a second projection lens for short-distance projection is attached in an exchangeable manner,
   wherein the distance information acquiring section acquires, as the distance information, information that identifies a projection lens attached to the lens attachment section, and
   the control section causes
      the first imaging section to capture an image of the projection surface in a case where the distance information shows that the first projection lens is attached to the lens attachment section, and
      the second imaging section to capture an image of the projection surface in a case where the distance information shows that the second projection lens is attached to the lens attachment section.

3. The projector according to claim 1,
   wherein the distance information acquiring section acquires information representing a projection distance of the projection lens as the distance information,
   the control section causes
      the first imaging section to capture an image of the projection surface in a case where the distance information shows that the projection distance is greater than or equal to the threshold, and
      the second imaging section to capture an image of the projection surface in a case where the distance information shows that the projection distance is smaller than the threshold.

4. The projector according to claim 1,
   further comprising an adjustment section that adjusts a projection image projected on the projection surface based on a captured image captured by the first imaging section or the second imaging section.

* * * * *